United States Patent [19]

Imabayashi et al.

[11] Patent Number: 5,357,164
[45] Date of Patent: Oct. 18, 1994

[54] ULTRASONIC MOTOR

[75] Inventors: Hiroyuki Imabayashi, Sagamihara; Takanao Fujimura, Kodaira; Tomoki Funakubo, Hachioji, all of Japan

[73] Assignee: Olympus Optical Co., Ltd., Tokyo, Japan

[21] Appl. No.: 65,195

[22] Filed: May 20, 1993

[30] Foreign Application Priority Data

Jun. 8, 1992 [JP] Japan .................................. 4-147565

[51] Int. Cl.⁵ .............................................. H01L 41/18
[52] U.S. Cl. ........................................ 310/323; 310/340
[58] Field of Search ................... 310/323, 328, 340

[56] References Cited

U.S. PATENT DOCUMENTS

| | | | |
|---|---|---|---|
| 3,960,772 | 6/1976 | Fort et al. ...................... | 252/455 R |
| 4,436,787 | 3/1984 | Mikami et al. .................. | 428/447 |
| 4,542,001 | 9/1985 | Iino et al. ...................... | 423/311 |
| 4,546,018 | 10/1985 | Ryuzo et al. ................... | 427/407.2 |
| 4,779,018 | 10/1988 | Okuno et al. ................... | 310/323 |
| 4,793,182 | 12/1988 | Djorup .......................... | 73/336.5 |
| 4,914,338 | 4/1990 | Murakami ....................... | 310/323 |
| 4,926,085 | 5/1990 | Sawayama et al. .............. | 310/323 |

FOREIGN PATENT DOCUMENTS

| | | | |
|---|---|---|---|
| 0277482 | 11/1988 | Japan ............................. | 310/323 |
| 1-283072 | 11/1989 | Japan ............................. | H02N 2/00 |

*Primary Examiner*—Thomas M. Dougherty
*Attorney, Agent, or Firm*—Louis Weinstein

[57] ABSTRACT

An ultrasonic motor characterized by comprising:

an ultrasonic oscillator for generating ultrasonic oscillation on a specific surface;

a movable body pressure-bonded to a specific surface of the ultrasonic oscillator for moving the movable body by the ultrasonic oscillator in a given direction by ultrasonic oscillation; and a sliding element provided on one of a contact surface of the ultrasonic oscillator and a contact surface of the movable body and having a porous oxide coating in which hydrators are formed to substantially fill small holes in the oxide coating.

16 Claims, 5 Drawing Sheets

ULTRASONIC MOTOR

BACKGROUND OF THE INVENTION

1. Field of the Invention

The present invention relates to ultrasonic motors and, more particularly, to an ultrasonic motor in which a moving body pressure-bonded to a specific surface is relatively moved in a desired direction with respect to an ultrasonic oscillator or piezoelectric transducer, by ultrasonic oscillation which is generated on the specific surface of the ultrasonic oscillator.

2. Related Art and Prior Art Statement

Conventionally, various kinds of ultrasonic motors are known. For example, an example of such Ultrasonic motors is disclosed also in Japanese Patent Laid-Open No. IIE 1-283072/1989. FIG. 14 of the attached drawings is a schematic view showing a principal portion of the conventional ultrasonic motor. The ultrasonic motor is an ultrasonic oscillation-wave motor for friction-driving a movable body 113 which is in contact with an oscillation body 112 through an oscillation surface, by a successive or progressive oscillation wave which is generated on the oscillation body 112 which is joined to a piezoelectric element 11, in FIG. 14. The ultrasonic motor is formed by a cemented earbide material in which hard alumite treatment (the registered name, in Japan, of a method in which aluminum is anodic-oxidized to form a corrosion resistant oxide film) due to an anodic oxidation method is applied to any one of a friction surface of the oscillation body 112 and a friction surface of the moving body 113, and the other friction surface is formed by a cemented carbide material which consists of a nickel-phosphorus group alloy containing one or more of boron carbide, boron titanium and boron nitride.

It is aimed that service life of the ultrasonic motor is improved by a sliding element due to the hard alumite, and a driving force is improved by driving of the moving body due to a high $\mu$ friction surface (a friction surface high in coefficient of friction).

By the way, such combination of the conventional sliding elements is an extremely effective means. However, there are still many problems if a point of service life is considered. That is, the service life of the above-described conventional ultrasonic motor is still short as compared with service life of an electromagnetic motor. Practical points obstruct or hinder the diffusion or the spread of the ultrasonic motor. The problems of the service life will hereunder be described.

In a case where abrasion is generated, hard alumite on the side of the moving body is shaved so that flour in the form of powder (dimension or size thereof is of the order of sub-$\mu$m) and flour in the form of flake (dimension or size thereof is of the order of several tens of $\mu$m) are generated. Generation of the flour in the form of flake results from falling-off or coming-off phenomena in the vicinity of a surface of the hard alumite. This results from the fact that crystal structure of the hard alumite is weak.

Once the falling-off phenomena occurs, the flour in the form of flake gets into a location between the moving body and the oscillating body and performs an action much like an abrasion grain so that the falling-off phenomena is promoted or strengthened. That is, the flour in the form of flake shaves the surface of the hard alumite while rolling a location between frictional surfaces. At this time, plenty of or a large quantity of minute or fine flour in the form of powder is generated from the surface of the hard alumite so that the surface of the hard alumite is further shaved. Accordingly, the service life of the hard alumite, that is, the service life as the ultrasonic motor is noticeably or remarkably reduced.

FIG. 11 is a perspective view showing, in enlargement, a cross-section of the above-described conventional hard alumite.

Alumite 1 is a corrosion resistant oxide film which is formed by anodizing of aluminum 3. In this connection, a barrier layer 2 is an intermediate element between the alumite 1 and the aluminum 3, and is expressed by $Al_2 + Al_2O_3 \cdot H_2O$.

Immediately after electrolysis, the alumite 1 is brought to a porous oxide film $\gamma$-$Al_2O_3$ in which a plurality of minute bores or small holes are formed in a surface of the alumite 1. Under this condition, however, the alumite 1 is lacking in durability. Accordingly, sealing is normally performed due to nickel acetate or the like so that the small holes 4 are closed up or filled up.

As shown in FIG. 11, however, sealing is performed only up to a range 105 of several $\mu$m from the surface of the alumite 1 by the sealing due to the above-described nickel acetate or the like. That is, sections of the respective small holes 4 from lower portions to bottom portions thereof are brought to a hollow condition. Further, this phenomena is remarkably seen as film thickness of the alumite 1 is thick. If a part of the surface of the alumite 1 falls off by abrasion, a plurality of hollow small holes 4 appear in the surface of the alumite 1. This weakens or reduces the strength of the alumite 1 per se. The falling-off phenomena becomes more and more violent so that abrasion is promoted.

On the other hand, FIG. 12 is a perspective view showing, in enlargement, an example of each of corners of the above-described alumite 1. As shown in FIG. 12, however, the alumite 1 is not formed on a corner 107. This is due to the fact that the alumite 1 has such a property as to be grown on the surface of the aluminum 3 only in a vertical direction. Thus, the alumite 1 is brought to such a condition that the alumite 1 is broken at the corner 107 and a cross-sectional surface thereof is exposed. Under this condition, if a force is applied to the corner 107 from tile outside, such a phenomena occurs that a small piece 108 is missing or is omitted from the corner 107, and the alumite 1 is broken or collapsed from the falling-off portion.

FIG. 13 is an enlarged perspective view showing another example of the corners of the above-described alumite 1 and is an example in which, as shown in FIG. 13, chamfering in the form of C-plane applied to the corner. Also in this case, however, the alumite 1 is brought to a broken condition, and a plurality of small pieces 108 are left out or are missing from the alumite 1 similar to the case illustrated in FIG. 12. The small pieces 108 are larger than the aforementioned flour in the form of flake and further promote an action of the abrasion grain.

OBJECTS AND SUMMARY OF THE INVENTION

It is a first object of the invention to provide an ultrasonic motor which is reduced in abrasion and which realizes long service life.

It is a second object of the invent;ion to provide an ultrasonic motor which has a sliding element in which small pieces are not missing or are not left out and which realizes long service life.

It is a third object of the invention to provide an ultrasonic motor in which generation of flour in the form of flake on a surface of an alumite (surface falling-off) is significantly reduced and which also suppresses or restraining generation of flour in the form of powder.

It is a fourth object of the invention to provide an ultrasonic motor in which, even if abrasion occurs on a surface of alumite, a condition of the surface is always constant so that abrasion does not become noticeable or remarkable.

It is a fifth object of the invention to provide an ultrasonic motor in which hydrators formed by steam sealing perfectly or completely fill up small holes in alumite respectively so that the strength of the alumite is improved.

It is a sixth object of the invention to provide an ultrasonic motor in which binding power or bonding strength of hexagonal crystals of alumite is high so that there is reduced in falling-off (flour in the form of flake) which is generated from boundary surfaces or interfaces of the crystals.

It is a seventh object of the invention to provide an ultrasonic motor in which coating is not broken at the corners of a sliding element.

It is an eighth object of the invention to provide an ultrasonic motor in which corrosion resistance is improved.

In brief, an ultrasonic motor according to the invention comprises:

an ultrasonic oscillator for generating ultrasonic oscillation on a specific surface;

a movable body pressure-bonded to the specific surface of the ultrasonic oscillator for moving the movable body by the ultrasonic oscillator due to the tile ultrasonic oscillation in a desired direction; and a sliding element consisting of a porous oxide film which is provided on any one of a contact surface of the ultrasonic oscillation and a contact surface of the movable body, wherein hydrators are formed respectively within small holes in the aforesaid porous oxide film substantially over an entire area.

These objects and advantages of the present invention will become further apparent from the following detailed explanation.

DETAILED DESCRIPTION OF THE PREFERRED EMBODIMENTS

Various embodiments of the present invention will hereunder be described with reference to the accompanying drawings.

Figure 1:
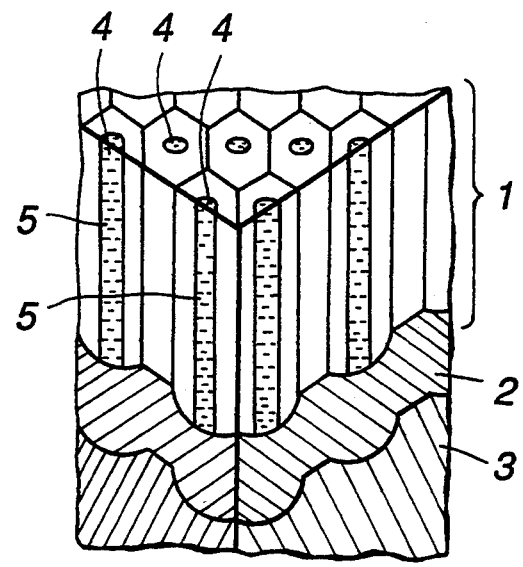
FIG. 1 is a fragmentary enlarged cross-sectional view showing a porous oxide coating applied to a sliding element in an ultrasonic motor according to the invention.

FIG. 1 is a fragmentary enlarged cross-sectional perspective view showing a first embodiment of porous oxide coating (alumite) which is applied to a sliding element of an ultrasonic motor according to the invention.

As shown in FIG. 1, hydrators 5 are filled respectively within minute apertures or small holes 4 formed in an alumite 1 up to bottoms of the respective small holes 4. As the hydrators 5, boehmite is the most adequate which is expressed by the following chemical formula, although the hydrators 5 are different from each other depending upon sealing temperature:

$$Al_2O_3 + H_2O \rightarrow 2AlO(OH) \rightarrow Al_2O_3 \cdot H_2O$$

In the present embodiment, when the hydrators 5 are formed up to the bottoms of the respective small holes 4, a steam sealing method is utilized or adopted. The steam sealing method is a treatment method in which a material to be treated in alumite is left alone for a predetermined period of time under steam of high temperature and high pressure to seal the small holes. More specifically, in FIG. 1, if a material to be treated in alumite having an aluminum 3, a barrier layer 2 and the alumite 1 is left alone more than 30 minutes within steam atmosphere having, for example, a temperature in the range of 100° C.~200° C. and a pressure in the range of 3~10 atm, the hydrators 5 such as boehmite ($Al_2O_3 \cdot H_2O$) or the like are generated by chemical change respectively within the small holes 4 in the alumite 1. Thus, the small holes 4 are filled up with the hydrators 5.

The alumite 1 in which the small holes 4 are perfectly or completely filled with the hydrators 5 forms a structure whose strength thereof is improved to several ten times as compared with alumite of a hollow condition. Furthermore, since the alumite 1 is cooled after the alumite 1 has been placed under the high temperature, crystal structure thereof is brought also to structure which is stronger by the effects of annealing.

By doing so, generation of flour in the form of flake (surface falling-off) on a surface of the alumite 1 is extremely reduced, and it is possible also to restrain or suppress generation of flour in the form of powder. Moreover, even if friction occurs on the surface of the alumite 1, the condition of the surface is always constant, and there is no case where abrasion becomes remarkable or noticeable.

Figure 13:
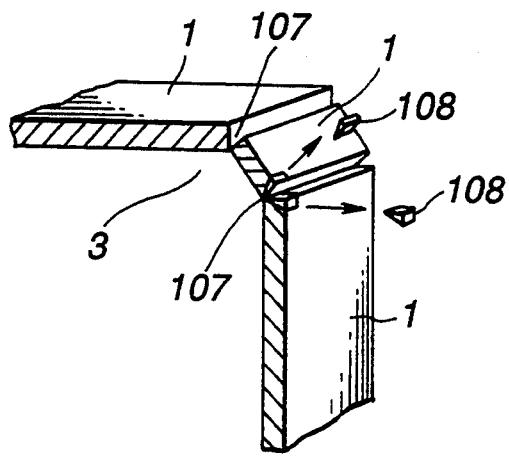
FIG. 13 is a fragmentary enlarged perspective view showing another example of the corner of the above-described hard alumite.
Figure 14:
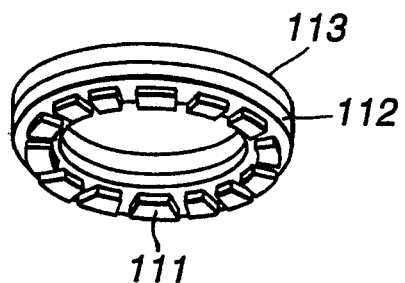
FIG. 14 is a schematic perspective view showing a principal portion of an example of a conventional ultrasonic motor.

On the other hand, by the fact that chamfering in the form of curved surface is applied to corners of the alumite 1, the alumite 1 free from cracking or breaking is formed on the entire surfaces of the respective corners. There is no generation of small pieces 108 (refer to FIG. 13).

Various embodiments of the ultrasonic motor will be described each of which is provided with the sliding element on which the small holes 4 in alumite 1 are completely filled with the hydrators 5 as described above after the alumite treatment or processing has been applied thereto.

Figure 2:
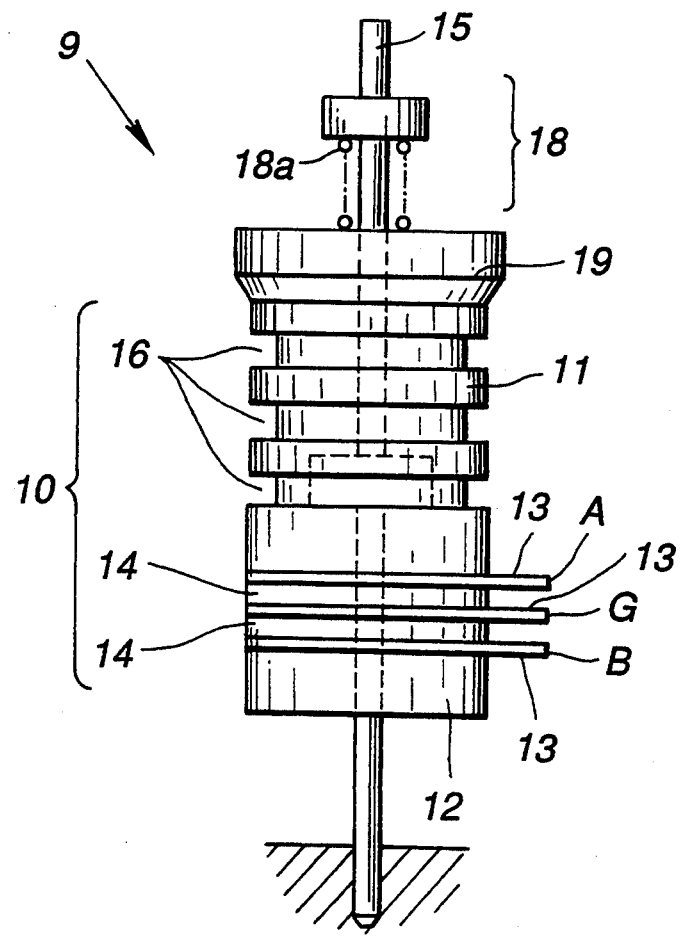
FIG. 2 is a side elevational view showing an ultrasonic motor according to a first embodiment of the invention.
Figure 3:
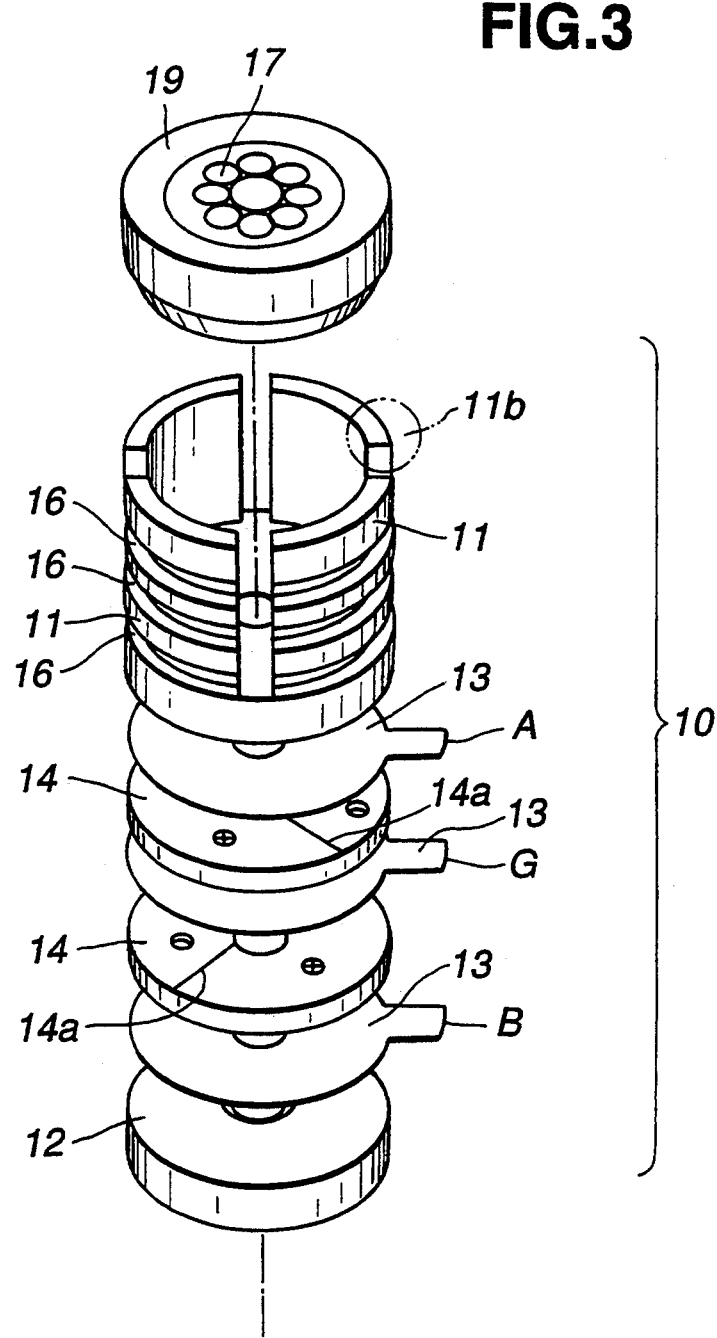
FIG. 3 is an enlarged exploded perspective view showing a laminated condition of a principal portion in the ultrasonic motor according to the first embodiment.

FIG. 2 is a side elevational view showing a laminated condition of the ultrasonic motor according to the first embodiment of the invention. FIG. 3 is an enlarged perspective view showing an arrangement of a principle portion of the ultrasonic motor according to the first embodiment.

As shown in FIG. 2, an ultrasonic motor 9 has a principal portion thereof which comprises an ultrasonic oscillator 10 in which a pair of resonators 11 and 12 are arranged respectively at an upper location and a lower location of two piezoelectric elements 14 arranged between three electrodes 13, and a rotor 19 that is a movable body which is pressure-bonded to one end surface of the ultrasonic oscillator 10 and which is rotated in a predetermined direction by ultrasonic oscillation of the ultrasonic oscillator 10.

As shown in FIG. 3, each of the piezoelectric elements 14 exhibits an annular, disk shaped configuration, and a pair of sections of the piezoelectric element 14 are polarized into opposite direction the oppositely polarized sections of elements 14 being separated by boundary lines 14a which pass respectively through the centers of the respective piezoelectric elements 14. The two piezoelectric elements 14 are arranged in a laminated direction such that the polarization boundary lines 14a are 90° from each other. Further, the resonators 11 and 12 oscillated by expansion and retraction of the piezoelectric elements 14 are arranged vertically of the piezoelectric elements 14 so as to put the piezoelectric elements 14 therebetween. Furthermore, the voltage-applying electrode plates 13 having respective contact planes thereof substantially the same in dimension or size and substantially the same in model as the piezoelectric elements 14 are so arranged as to be put between the two piezoelectric elements 14 and the resonators 11 and 12. Terminals A, G and B are so provided as to project respectively from the three electrode plates 13, and are connected respectively to power sources (not shown).

The ultrasonic oscillator 10 is arranged such that the two piezoelectric elements 14, the resonators 11 and 12 and the three electrode plates 13 are laminated upon each other as illustrated in FIG. 3 and respective centers of these constituent elements are tightened and fixed to each other with a predetermined clamping force by a fixing bolt 15 (refer to FIG. 2).

The resonator 11 presents a hollow cylindrical configuration having a bottom. Two pairs of longitudinal cut-outs are formed in an upper portion of the resonator 11 in two radial directions intersecting so as to be perpendicular to each other. An end face of the resonator 11 is thus divided into quarters. Moreover, a plurality of grooves 16 are formed in a central direction on a side surface of an outer periphery of the resonator 11 in order to increase oscillation of the resonator 11. On an end face of the resonator 11, that is, on an end face of the ultrasonic oscillator 10, the rotor 19 which is rotated in a predetermined direction by ultrasonic oscillation of the ultrasonic oscillator 10 is born or supported and is arranged on the fixing bolt 15 through a plurality of bearings 17. An urging mechanism 18 (refer to FIG. 2) comprising to a spring 18a supported around the fixing bolt 15 is arranged on a side of the rotor 19 opposite to a contact surface of the rotor 19 with the ultrasonic oscillator 10 so that the rotor 19 is urged against the end face of the resonator 11 by an urging force of the spring 18a.

The rotor 19 is made of tool steel which is heat-treated so that hardness thereof is brought to a value equal to or more than Hv 650. Further, the resonator 11 is made of a material superior in oscillation transmission, for example, to the alumite 1 (refer to FIG. 1) in which alumite oxalate treatment is applied to an aluminum alloy by thickness of 50 $\mu$m. The alumite 1 is treated to obtain sealing by steam sealing (under steam having temperature of 140° C., pressure of 4 arm and shelf time of 100 minutes) so that the small holes 4 (refer to FIG. 1) are perfectly (i.e. completely filled with the hydrators 5.

Figure 4:
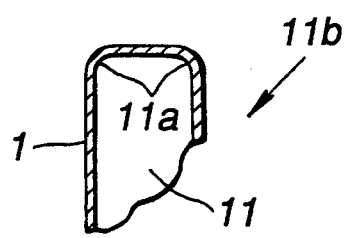
FIG. 4 is an enlarged cross-sectional view showing a contact portion between an ultrasonic oscillator and a rotor.

On the other hand, FIG. 4 is a cross-sectional side elevational view showing, in enlargement, an end of the resonator 11.

As shown in FIG. 4, chamfering (radius r=0.1 mm in the present embodiment) in the form of curved configuration whose radius is equal to or more than twice the film thickness of the alumite 1 is applied to the corners 11a of the contact surface of the resonator 11 in contact with the rotor 19. Alumite treatment is also applied to the corners 11a.

The ultrasonic motor 9 arranged as described above is arranged as follows. That is, sine-wave voltage in the vicinity of resonance frequency is applied to the terminals A and B of the respective electrode plates 13 arranged respectively on the upper one and the lower one of the electrode plates 13 in staggered relation in 90° in a manner of time. The terminal G of the electrode plate 13 arranged between the two piezoelectric elements 14 is grounded. Thus, bending vibration or oscillation of primary mode is generated on the ultrasonic oscillator 10 around a central axis of the oscillator 10 so that the rotor 19 is rotated in a predetermined direction.

The ultrasonic motor according to the above-described first embodiment has the following advantages.

The hydrators 5 formed by the steam sealing completely fill respectively the small holes 4 in the alumite 1 so that the strength of the alumite 1 is improved. That is, since the small holes 4 are filled, there is provided strength of the compression proof force and the bending proof force of the coating of the alumite 1, which is about three times that of normal coating, for example, the alumite oxalate coating sealed by sealing due to nickel acetate. Even if the surface of the alumite 1 is abraded or worn by initial abrasion, the small holes 4 are not exposed under a hollow condition, that is, the small holes 4 are not exposed having respective openings therein. Accordingly, it is possible to stably maintain a coefficient of friction and the like so that wearing or abrasion is not promoted.

Moreover, since the alumite 1 is cooled after having been placed under high temperature, binding power or bonding strength of the hexagonal crystal of the alumite 1 is strengthened by the effects of annealing. Thus, falling-off of the crystal (powder in the form of flake) which occurs from the boundary surface is reduced.

Further, chamfering in the form of a curved surface is applied to the corners 11a of the resonator 11. Accordingly, an aluminum surface is formed on the corners 11a without the coating of the aforesaid alumite 1 being broken. Here, for the chamfering, it is required that dimension or size equal to or more than twice the film thickness of the alumite 1 is brought to radius size. In a case where a value equal to or less than the radius size is brought to radius size, a plurality of cracks are developed on the chamfering portions, and breaking away missing of the small pieces like a conventional arrangement is apt to be generated.

Furthermore, of the porous oxide coatings (alumite 1), the alumite oxalate used in the present embodiment is larger in crystal structure than commonly used sulfuric acid alumite, is high in hardness and is particularly superior in corrosion resistance.

In this manner, it is effective in improving the coating strength of the alumite to perfectly or completely fill the small holes in the alumite with the hydrators. Generation of the powder in the form of flake which causes abrasion is reduced. Thus, flour in the form of powder caused thereby is also, reduced. Moreover, there is nothing in generation of breaking away of small pieces by the chamfering of curved configuration of the corners so that it is possible to provide an ultrasonic motor long in service life. In a case of the ultrasonic motor of this type, there is a difference of about five times in service life between the normal or ordinary alumite and the alumite completely filled with hydrators. In this connection, since the alumite in which such small holes are completely filled is improved in several steps also in corrosion resistance, it is made possible to apply the alumite also to a field of art such as a medical care in which chemicals are much used.

An ultrasonic motor according to a second embodiment of the invention will next be described.

Figure 5:
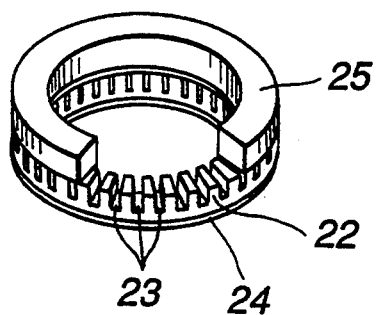
FIG. 5 is a schematic perspective view of an ultrasonic motor according to a second embodiment of the invention.
Figure 6:
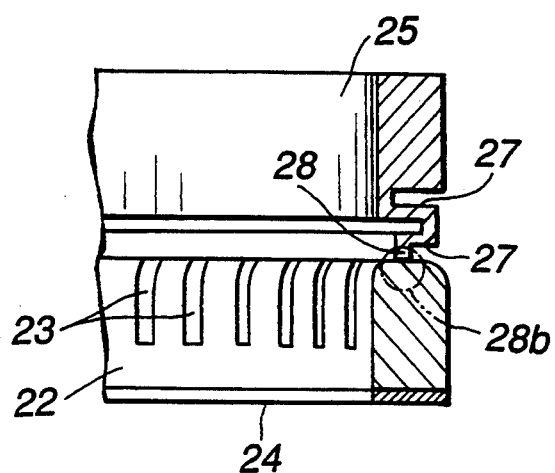
FIG. 6 is a fragmentary enlarged side elevational cross-sectional view showing a contact portion between a rotor and an elastic or resilient body in the second embodiment of the invention.
Figure 7:
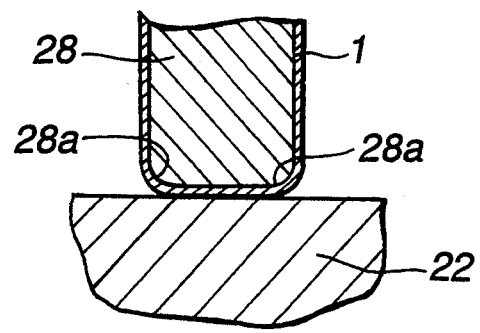
FIG. 7 is a fragmentary enlarged cross-sectional view showing a minute or small projection of the rotor.

FIG. 5 is a schematic perspective view showing the ultrasonic motor according to the second embodiment of the invention. FIG. 6 is a fragmentary enlarged side elevational cross-sectional view showing a contact portion between a rotor and a resilient or elastic body in the ultrasonic motor. FIG. 7 is an enlarged cross-sectional view showing a micro projection on the rotor in the ultrasonic motor.

The second embodiment is directed to the ultrasonic motor provided with a sliding element which is formed with an alumite 1 in which small holes 4 are completely filled respectively with hydrators 5 as described above after alumite treatment similar to that in the first embodiment has been applied thereto. However, the ultrasonic motor is a progressive-wave type ultrasonic motor having a ring configuration.

As shown in FIG. 5, a resilient or elastic body 22 in the form of ring has one end face thereof in which a plurality of oscillation magnification grooves 23 are formed in a radial direction, and the other end face to which a piezoelectric element 24 so polarized as to generate progressive waves is joined. In this connection, the elastic body 22 is made of, for example, SUS440C, and hardness thereof is brought to a value equal to or more than Hv 900 by heat treatment. A rotor 25 in the form of a ring is arranged on one end face (an upper face in FIG. 4 of the elastic body 22. The rotor 25 is made of an aluminum alloy, and has a surface thereof on which the alumite 1 treated in a mixture bath of sulfuric said and citric acid is formed having a thickness of 30 $\mu$m. The alumite 1 is such that the small holes 4 are completely filled with hydrators 5 by steam sealing similar to the aforesaid first embodiment. In this connection, conditions of the steam sealing are similar to those of the aforementioned first embodiment.

As shown in FIG. 6, the rotor 25 has a lower portion thereof which is formed with a pair of flanges 27 having a spring nature. A minute or small projection 28 in the form of ring projects on a contact surface between the lower flange 27 and one end face (an upper surface in FIG. 4 of the elastic body 22 so that the rotor 25 receives oscillation of the elastic body 22 through the projection 28 and is rotated in a predetermined direction.

FIG. 7 shows, in enlargement, a contact portion 28b between the elastic body 22 and the projection 28 in FIG. 6. As shown in FIG. 7, the projection 28 has a pair of corners 28a to which chamfering in the form of curved surface is applied and whose radius dimension is twice the film thickness of the alumite 1 (r=0.2 mm in the present embodiment). In this connection, since the alumite 1 covers the entire projection 28, the corners 28a of the projection 28 are also covered by the alumite 1.

In connection with the above, the present second embodiment should not be limited to the alumite oxalate which is used also in the aforesaid first embodiment. However, if alumite sulfate, alumite phosphate, alumite chromates and the like that are porous oxide coating are used, there can be produced advantages similar to those of tile aforementioned first embodiment. Accordingly, the present second embodiment can use such alumite which are lower in cost than the alumite oxalate, and which are adequate as quantity production articles.

An ultrasonic motor according to a third embodiment of the invention will next be described.

Figure 8:
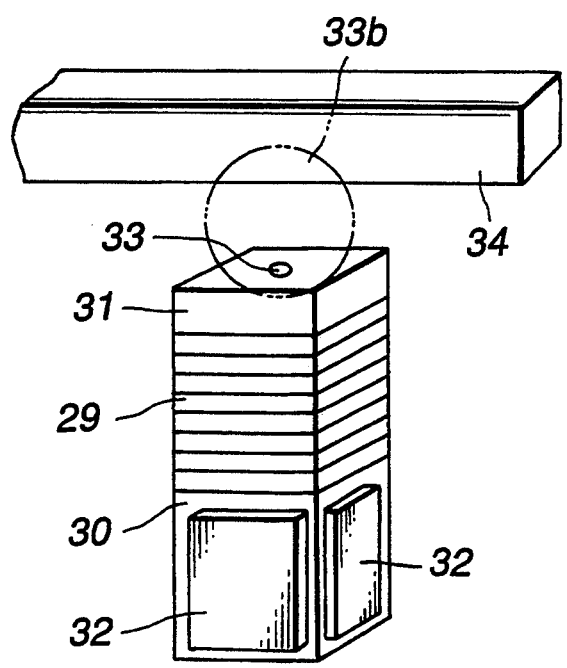
FIG. 8 is a schematic perspective view showing an ultrasonic oscillator and a moving body of an ultrasonic motor according to a third embodiment of the invention.
Figure 9:
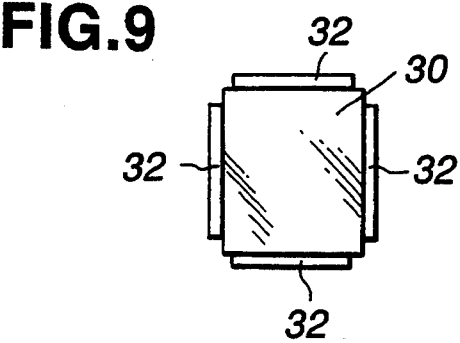
FIG. 9 is a bottom view, as viewed from below, of the ultrasonic motor according to the third embodiment of the invention.
Figure 10:
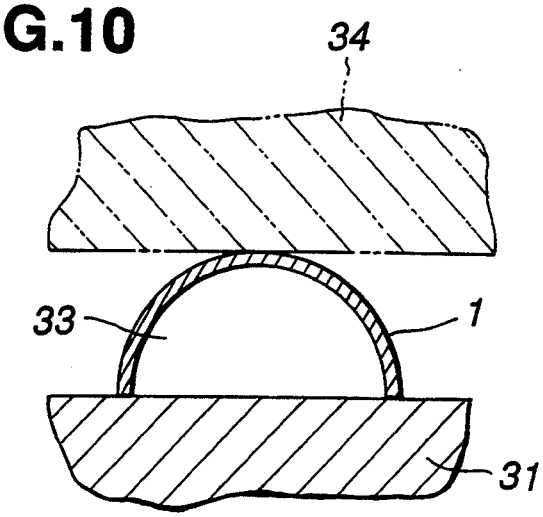
FIG. 10 is a fragmentary enlarged cross-sectional view showing a contact portion between the movable body and the ultrasonic oscillator of the ultrasonic motor according to the third embodiment of the invention.
Figure 11:
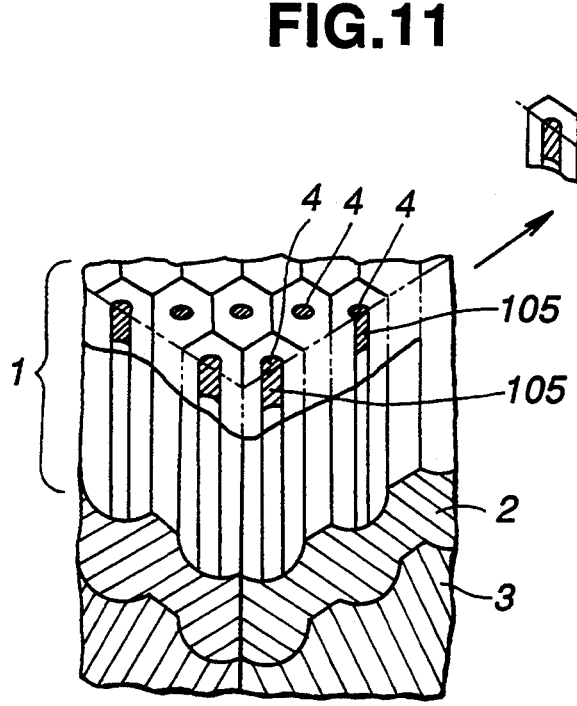
FIG. 11 is a fragmentary perspective view showing, in enlargement, a cross-section of conventional hard alumite.
Figure 11A:
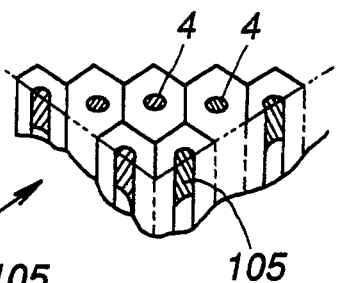
FIG. 11a is a perspective view of an upper portion of the structure shown in FIG. 11.
Figure 12:
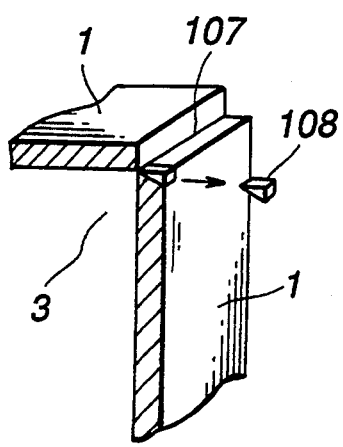
FIG. 12 is a fragmentary perspective view showing, in enlargement, an example of a corner of the above-mentioned hard alumite.

FIG. 8 shows an ultrasonic motor according to the third embodiment of the invention and is a schematic perspective view showing an ultrasonic oscillator and a movable body. FIG. 9 is a bottom view showing the ultrasonic oscillator as viewed from below. FIG. 10 is an enlarged cross-sectional view showing a contact portion between the movable body and an elastic body in the ultrasonic oscillator.

The third embodiment is also directed to an ultrasonic motor which is provided with the sliding element formed with alumite 1 having small holes 4 completely filled with hydrators 5 as described above, after application of the alumite treatment, similar to the aforesaid first and second embodiments. However, the ultrasonic motor is an ultrasonic motor of linear type.

As shown in FIG. 8, a laminated-type piezoelectric actuator 29 has one end face thereof (a lower surface in FIG. 5 to which a resilient or elastic body 30 formed by, for example, phosphor bronze is bonded which has a cross-sectional configuration the same in magnitude or size as the laminated-type piezoelectric actuator 29. An elastic body similarly made of phosphor bronze having a cross-sectional configuration the same in size as the laminated-type piezoelectric actuator 29 is bonded to the other end face (an upper surface in FIG. 8). As shown in a bottom view in FIG. 9, the elastic body 30 has four side surfaces to which piezoelectric elements 32 each having the same configuration are bonded respectively in directions perpendicular to a laminated direction of the laminated-type piezoelectric actuator 29, to excite oscillation of a bending mode in four directions.

The elastic body 31 has an upper surface thereof from a central portion of which a semispherical projection 33, made of an aluminum alloy, projects as shown in FIG. 8 that a movable body 34 is so arranged as to be urged against the elastic body 31 through the projection 33. In this connection, a contact portion 33b between the projection 33 and the moving body 34 is as shown in an enlarged view in FIG. 10. The projection 33 has a surface thereof to which alumite treatment is applied similar to the first and second embodiments. For example, aluminum oxalate is formed having a thickness of 40 μm. Moreover, a radius of the semispherical projection 33 is equal to or more than twice of the film thickness of the alumite 1 formed on the surface of the semi-spherical projection 33.

Furthermore, the alumite 1 is such that the small holes 4 are respectively filled with hydrators 5 by steam sealing similar to the first and second embodiments. Conditions of the steam sealing are similar to those of the first and second embodiments. However, shelf time is further lengthened. Moreover, the movable body 34 is such that hardness thereof is brought to a value equal to or more than Hv 900 with tool steel by heat treatment.

The ultrasonic oscillator synthesizes or composes longitudinal oscillation From the laminated-type piezoelectric actuator 29 and oscillation of the bending mode generated by the use of two of the opposed piezoelectric elements 32 arranged respectively on the side surfaces of the elastic body 30 with each other, to generate elliptic oscillation on the semi-spherical projection 33, to thereby move linearly the moving body 34 pressure-bonded to the projection 33, by urging means (not shown).

According to the third embodiment, the sliding element arranged between the elastic body 31 and the moving body 34 is formed by the semi-spherical projection 33 whose radius is equal to or more than twice the film thickness of the alumite 1. Accordingly, it is possible to prevent breaking away of small pieces and the like from being generated. Moreover, by the fact that the shelf time of the steam sealing increases, filling density of the hydrators 5 respectively into the small holes 4 increases. Thus, it is possible to further improve the strength to raise corrosion resistance. The service life as the ultrasonic motor is also lengthened.

As described above, according to the present invention, it is possible to provide an ultrasonic motor in which all the small holes in the alumite are filled respectively with hydrators to thereby improve the strength and the binding force of the alumite, and chamfering in the form of curved surface is applied to the sliding element, whereby the ultrasonic motor has the sliding element which is less in abrasion and which avoids breaking away of small pieces, and it is realized to lengthen the service life of the ultrasonic motor.

In this invention, it is apparent that working modes different in a wide range from each other can be formed on this basis of this invention without departing from the spirit and scope of the invention. This invention is not restricted by any specific embodiments except being limited by the appended claims.

What is claimed is:

1. An ultrasonic motor characterized by comprising:
    an ultrasonic oscillator for generating ultrasonic oscillation on a specific surface;
    a movable body pressure-bonded to the specific surface of said ultrasonic oscillator for moving said body in a desired direction by said ultrasonic oscillation; and
    a sliding element provided on one of a contact surface of said ultrasonic oscillator and a contact surface of said movable body said sliding element comprising a porous oxide coating having small holes in which hydrators are formed which substantially entirely fill said small holes in the porous oxide coating, and which do not physically change the structure of the porous oxide coating.

2. An ultrasonic motor according to claim 1, wherein said hydrators are boehmite.

3. An ultrasonic motor according to claim 1, wherein said porous oxide coating is alumite.

4. An ultrasonic motor according to claim 1, wherein said sliding element porous oxide coating has a thickness of the order of 50 μm.

5. An ultrasonic motor characterized by comprising:
    an ultrasonic oscillator for generating ultrasonic oscillation on a specific surface;
    a movable body pressure-bonded to the specific surface of said ultrasonic oscillator for moving said movable body in a desired direction by said ultrasonic oscillation; and
    a sliding element provided on one of a contact surface of said ultrasonic oscillator and a contact surface of said movable body. Said sliding element comprising a porous oxide coating in which hydrators are formed to substantially fill small holes in the porous oxide coating; and
    chamfering in the form of curved surface configuration being applied to a corner of one of the contact surfaces.

6. An ultrasonic motor according to claim 5, wherein said curved surface configuration has a radius thereof which is equal to or more than twice a thickness of the porous oxide coating.

7. An ultrasonic motor characterized by comprising:
    an ultrasonic oscillator for generating ultrasonic oscillation on a specific surface;
    a movable body pressure-bonded to the specific surface of said ultrasonic oscillator for moving said movable body a desired direction by said ultrasonic oscillation; and
    a sliding element provided on one of a contact surface of said ultrasonic oscillator and a contact surface of said movable body said sliding element comprising a porous oxide coating in which hydrators are formed to substantially fill small holes in the porous oxide coating; and said hydrators being filled respectively formed to fill said small holes in the porous oxide coating by steam sealing.

8. An ultrasonic motor according to claim 5 wherein the steam temperature of the steam sealing is in the range of 100° C. to 200° C.

9. An ultrasonic motor according to claim 8 wherein the steam temperature of said steam sealing is of the order of 140° C.

10. An ultrasonic motor according to claim 8 wherein the steam pressure of the steam sealing is in the range of 3–10 atmospheres.

11. An ultrasonic motor according to claim 7 wherein the steam sealing occurs at a temperature of 140° C. and a pressure of 4 atmospheres.

12. An ultrasonic motor characterized by comprising:
an ultrasonic oscillator for generating ultrasonic oscillation on a specific surface;
a movable body pressure-bonded to the specific surface of said ultrasonic oscillator for moving said movable body in a desired direction by said ultrasonic oscillation; and
a sliding element provided on one of a contact surface of said ultrasonic oscillator and a contact surface of said movable body said sliding element comprising a porous oxide coating in which hydrators are formed to substantially fill small holes in the porous oxide coating; and 13. An ultrasonic motor characterized by comprising:
an ultrasonic oscillator for generating ultrasonic oscillation on a specific surface;
a movable body pressure-bonded to the specific surface of said ultrasonic oscillator for moving said movable desired direction by said ultrasonic oscillation; and
a sliding element provided on one of a contact surface of said ultrasonic oscillator and a contact surface of said movable body said Sliding element comprising a porous oxide coating in which hydrators are formed to substantially fill holes in the porous oxide coating; and 14. An ultrasonic motor characterized by comprising:
an ultrasonic oscillator for generating ultrasonic oscillation on a specific surface;
a movable body pressure-bonded to the specific surface of said ultrasonic oscillator for moving said movable body in a desired direction by said ultrasonic oscillation; and
a sliding element provided On one of a contact surface of said ultrasonic oscillator and a contact surface of said movable body said sliding element comprising a porous oxide coating in which hydrators are formed to substantially fill small holes in the porous oxide coating; and
said porous oxide coating is alumite phosphate.

15. An ultrasonic motor characterized by comprising:
an ultrasonic oscillator for generating ultrasonic oscillation on a specific surface;
a movable body pressure-bonded to the specific surface of said ultrasonic oscillator for moving said movable body in a desired direction by said ultrasonic oscillation; and
a sliding element provided on one of a contact surface of said ultrasonic oscillator and a contact surface of said movable body said sliding element comprising a porous oxide coating in which hydrators are formed to substantially fill small holes in the porous oxide coating; and 16. An ultrasonic motor characterized by comprising:
an ultrasonic oscillator for generating ultrasonic oscillation on a specific surface;
a movable body pressure-bonded to the specific surface of said ultrasonic oscillator for moving said movable desired direction by said ultrasonic oscillation; and
a sliding element provided on one of a contact surface of said ultrasonic oscillator and a contact surface movable body said sliding element comprising a porous oxide coating in which hydrators are formed to substantially fill small holes in the porous oxide coating; and
at least one of the contact surfaces having a curved corner, said sliding element having a thickness at least twice as great as the radius of curvature of said curved corner.

* * * * *